United States Patent
Davis et al.

(10) Patent No.: US 7,224,794 B1
(45) Date of Patent: May 29, 2007

(54) TRANSMITTING MESSAGE PLAYBACK CONCURRENT WITH SPEAKERPHONE OPERATION

(75) Inventors: Paul Joseph Davis, Wayne, PA (US); Vasu Iyengar, Allentown, PA (US); James Charles Popa, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/394,097

(22) Filed: Sep. 13, 1999

(51) Int. Cl.
*H04M 1/00* (2006.01)

(52) U.S. Cl. .................. 379/388.01; 379/391; 379/395

(58) Field of Classification Search .................. 379/68, 379/85, 87, 88.04, 388.01–388.07, 390.01, 379/390.03, 390.04, 391, 420.01, 420.02, 379/420.03, 395, 67.1, 70, 88.22, 432, 420.04, 379/392
See application file for complete search history.

(56) References Cited

U.S. PATENT DOCUMENTS

| 4,481,382 | A | * | 11/1984 | Villa-Real | ................ | 455/556.1 |
| 4,790,002 | A | * | 12/1988 | D'Agosto et al. | ............ | 379/70 |
| 4,817,127 | A | * | 3/1989 | Chamberlin et al. | ...... | 379/88.11 |
| 5,454,036 | A | * | 9/1995 | Gleeman et al. | ............ | 379/392 |
| 5,612,996 | A | * | 3/1997 | Li | .......................... | 379/406.06 |
| 5,646,990 | A | * | 7/1997 | Li | .......................... | 379/406.08 |
| 5,692,042 | A | * | 11/1997 | Sacca | .................... | 379/390.01 |
| 5,768,349 | A | * | 6/1998 | Knuth et al. | ............. | 379/88.22 |

\* cited by examiner

*Primary Examiner*—Fan Tsang
*Assistant Examiner*—Simon Sing

(57) ABSTRACT

A digital telephone answering device having speakerphone capability allows a recorded message to be played back and heard by the far-end party as well as over the local speakerphone by the near-end party during speakerphone operation as if it were a normal receive signal. Moreover, normal speakerphone conversation is possible during this conversational playback mode allowing the far-end party and/or near-end party to break-in over the played back pre-recorded message as desired and be heard by the other party. Both message and conversation signals are preferably (but not necessarily) at similar levels. Also, the message playback at the near end is preferably (but not necessarily) subject to the same speakerphone digital volume control as that received at the far end.

19 Claims, 5 Drawing Sheets

TRANSMITTING MESSAGE PLAYBACK CONCURRENT WITH SPEAKERPHONE OPERATION

BACKGROUND OF THE INVENTION

1. Field of the Invention

This invention relates generally to speakerphones including a voice messaging function. More particularly, it relates to the inclusion of a voice message playback signal together with a speakerphone signal in a telephone conversation.

2. Background of Related Art

Voice messaging systems such as telephone answering devices are well known. A typical telephone answering device allows a caller to record a voice message for a user who fails to answer an incoming telephone call. Initially, voice messaging systems recorded voice messages onto magnetic cassette tapes. However, more recent voice messaging systems record voice messages into digital memory (e.g., typically non-volatile memory such as Flash memory).

To retrieve a recorded voice message, a user typically activates a PLAY function of the telephone answering device, either locally or from a remote location over a telephone line. In a remote access mode, the conventional telephone answering device replaces handset access to the telephone line with a signal path from the played back voice messages to the telephone line. In either case, the playback of a voice message is conventionally heard only by the user, either locally or at the remote location.

Oftentimes it is desired to share a particular voice message with someone else. To do so, the conventional user must call and verbally paraphrase or repeat the voice message which they played back for themselves. It is possible to playback a voice message and hold the handset of a telephone toward the speaker of the telephone answering device, allowing an uncontrolled level of the played back voice message to be coupled into the telephone call between the user and the other person at the far end of a telephone call. Unfortunately, this typically requires the user to take the handset away from their own ear, preventing the user from participating in a conversation with the far end party while picking up some level of the played back message.

There is a need for an improved apparatus and technique for allowing a user of a telephone answering device to share a recorded voice message with another party.

SUMMARY OF THE INVENTION

In accordance with the principles of the present invention, a transmit path of a voice messaging system with speakerphone capability comprises a microphone signal, a gain module, a message playback signal relating to a pre-recorded voice message, and a summer in the transmit path. The message playback signal is combined with the microphone signal for transmission over a telephone line such that a far end user will simultaneously hear the microphone signal and the message playback signal.

A method of simultaneously transmitting a microphone signal and a played back pre-recorded voice signal to a far end party over a telephone line using a speakerphone in accordance with another aspect of the present invention comprises establishing a telephone call. A transmit function of a speakerphone generating a microphone signal is initiated. A voice message pre-recorded on the speakerphone generating a playback message signal is played back. The microphone signal is combined with the playback message signal, and the combined microphone signal and playback signal are transmitted to a far end party over a telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention allows simultaneous playback of a voice message recorded in a voice messaging system, e.g., in a telephone answering device (TAD), while using a speakerphone function of the telephone answering device. Simultaneous inclusion of both a speakerphone conversation and a played back voice message allows both parties to a telephone conversation to listen to the message at a controlled level and converse over the speakerphone at the same time.

Conventional echo canceling speakerphones incorporate Acoustic and Hybrid echo cancelers to eliminate or reduce Acoustic and Line echo respectively. In addition, both the transmit (Tx) and receive (Rx) paths (i.e., the microphone and speaker paths, respectively) have AGC (Automatic Gain Control) and Gain blocks which together perform a signal conditioning function for the conversation. In addition, two voice activity detectors, and Transmit and Receive switch guards or Ratio tests, are often used together with switching state logic to maintain stability and full duplex communication in a speakerphone conversation.

In accordance with the principles of the present invention, a message playback signal is incorporated into the conversation signal to allow the far end party to hear the voice message at the same time a local speakerphone user is hearing the voice message in a way which is controlled. The controlled combination of the conversation and message signals allows simultaneous conversation on the same telephone line as that used to transmit a voice message to the far end party.

In general, two telephone answering device functions can occur during speakerphone operation; conversation record, and playback of a previously recorded message or memo during speakerphone conversation. In accordance with the principles of the present invention, conversation record multiplexes the microphone and line-in signals for recording on an appropriate medium, e.g., on magnetic tape or into digital memory (e.g., Flash memory).

The present invention provides that a recorded message can be played back and heard by the far-end party as well as over the local speakerphone by the near-end party as if it were a normal receive signal. The present invention allows normal speakerphone operation to continue during this playback operation, allowing the far-end party and the near-end party to break-in over the message as desired and be heard by the other party.

It is preferred that both the message and conversation signals be at similar levels. However, the present invention relates equally to the suppression or amplification of either the conversation signal or the voice message playback signal. Moreover, it is preferred (but not absolutely necessary) that the message playback at the near end be subject to the same speakerphone digital volume control at the far end.

Figure 1:
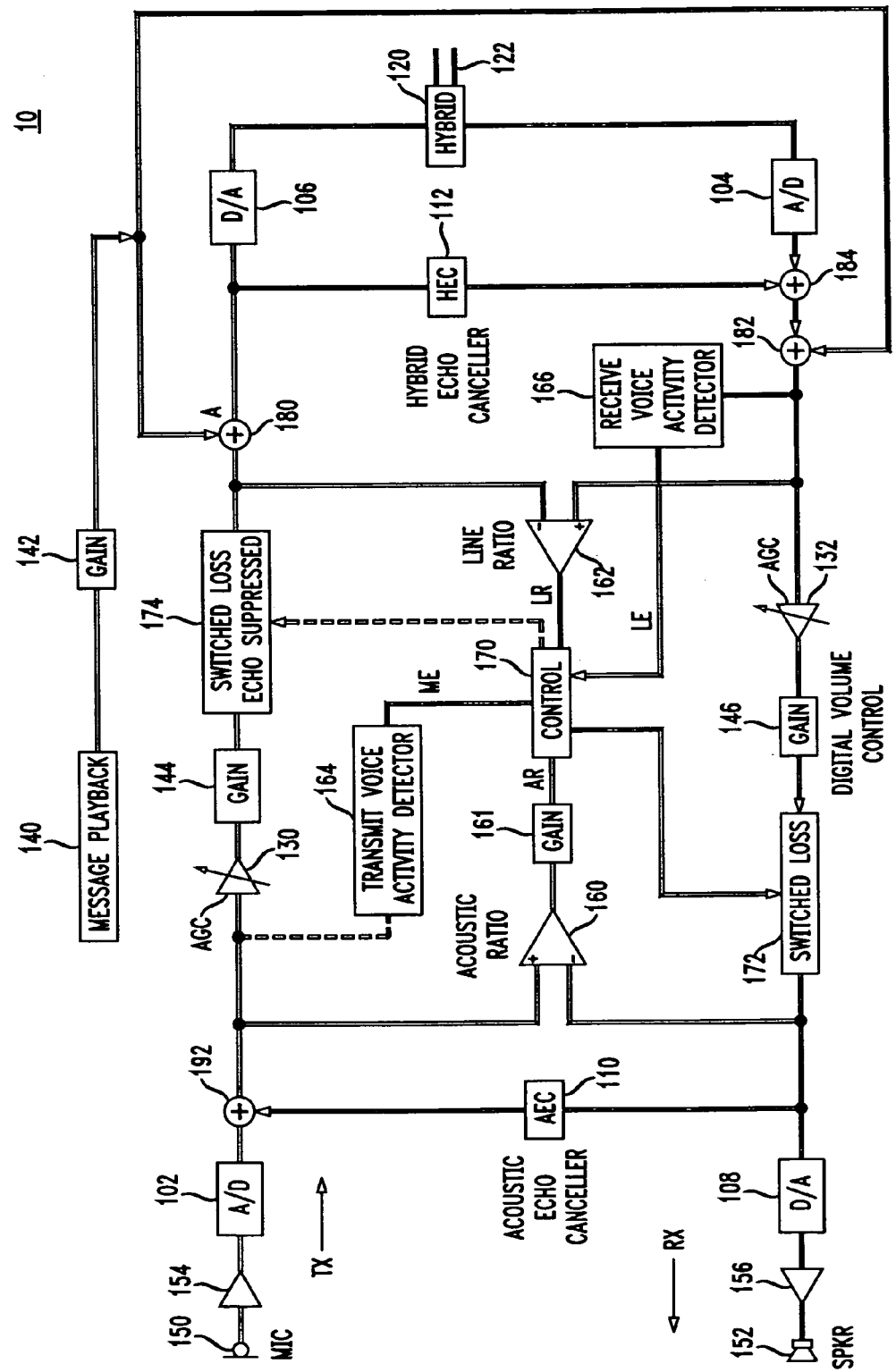
FIG. 1 shows a block diagram of an exemplary full-duplex digital speakerphone allowing combination of a played back voice message with a speakerphone conversation, in accordance with the principles of the present invention.

FIG. 1 shows a block diagram of an exemplary full-duplex digital speakerphone allowing combination of a played back voice message with a speakerphone conversation, in accordance with the principles of the present invention.

In particular, in FIG. 1, a telephone answering device with speakerphone capability 10 includes a message playback module 140 which generates an otherwise conventional message playback signal, and a speaker 152 and microphone 150 forming the basis of a speakerphone.

The microphone 150 provides a signal to a buffer/amplifier 154, which then provides a signal to an analog-to-digital converter 102 (e.g., within a codec or similar device). The digitized microphone signal has audio echoes cancelled in a summer 192 using an acoustic echo canceller (AEC) in communication with the speaker path. This echo cancelled signal is fed to one side of a comparator 160, with the other side of the comparator 160 being sourced from the speaker path. The output of the comparator 160 is provided to a suitable controller 170 through an appropriate gain module 161.

A transmit voice activity detector 164 is in communication with the microphone path, and provides a controller 170 with a signal indicating the presence of transmit voice activity.

The digitized and acoustic echo cancelled microphone signal is amplified to a given desired level in an automatic gain control (AGC) amplifier 130.

A fixed gain block 144 provides additional gain for input to a switched loss/echo suppression module 174. The output of the switched loss/echo suppression module 174 is fed to a comparator 162, which also receives an input from the speaker path before it is digitally amplified. The output of the comparator 162 is fed to the controller 170.

The controller 170 may be any suitable processor, e.g., a digital signal processor (DSP), a microcontroller, or a microprocessor.

A hybrid echo canceller (HEC) 112 cancels the transmit signal from the received signal by adding an inverted representation of the transmitted signal to the received signal, appropriately delayed, in a digital summer 184.

A digital-to-analog (D/A) converter 106 provides digital to analog conversion of the microphone path signal for injection onto a telephone line 122 through a hybrid 120.

In a receive direction, a received analog signal from the hybrid 120 is input to an analog-to-digital (A/D) converter 104. The output of the A/D converter 104 is added to an echo cancellation signal from the HEC 112.

A receive voice activity detector 166 provides information regarding the presence of a received signal to the controller 170.

The digitized and hybrid echo cancelled signal is amplified by an automatic gain control (AGC) module 132. A digital gain module 146 provides further fixed gain as set, e.g., by a digital volume control. The output of the gain module 146 is input to a switched loss module 172, which receives control information from the controller 170. The output of the switched loss module 170 is converted to an analog signal in a D/A 108, and output by the speaker 152 of the speakerphone 10.

Furthermore, in accordance with the principles of the present invention, a voice message playback signal is injected into the microphone (i.e., transmit) path for the benefit of the far end party, preferably at a point before the HEC 112. Also, or alternatively, the voice message playback signal may be injected into the receive path, i.e., into the local speaker path for the benefit of the near end party, preferably at a point after the HEC 112.

In particular, the signal output from the message playback module 140 is subjected to a fixed gain module 142, similar to that provided by the gain module 144 in the transmit path and to the gain module 146 in the receive path. This provides a desired level to the voice playback signal for injection at a controlled level into the receive and transmit paths of the speakerphone.

Preferably, a separate gain block 142 is applied to the played back voice message. Preferably, the gain level of the gain block 142 is at the same or similar level as that in the speakerphone transmit Tx path to keep the played back message and the conversation signals at the same or similar level.

The level-controlled message playback signal is digitally combined into the transmit path using the digital summer 180 in the transmit path before the D/A converter 106, and is digitally combined into the receive path using the digital summer 182 after the A/D converter 104 in the receive path.

Message playback to the far end party is achieved by mixing the played back message signal from the message playback module 140 with the speakerphone transmit signal, preferably after the transmit signal conditioning blocks (e.g., the AGC 130 and gain module 144) and switched loss block 174.

The HEC 112 cancels any hybrid echo of the message from appearing in the receive path.

The played back voice message is also to be heard over the local speaker 152 by the near-end party, preferably at the same level as the far-end party's conversation is heard. In the disclosed embodiment, this is accomplished by combining the played back voice message signal into the receive path before the AGC 132 and gain block 146, but after the output from the HEC 112.

In this way, the receive path AGC 132 maintains both the far-end conversation and the played back voice message at the same level for output by the speaker 152. Moreover, the receive path digital volume control applies to both the level of the played back voice message as well as to the level of the conversation.

The Acoustic Echo Canceller (AEC) 110 is used to reduce the coupling between the microphone and the local speaker. The Hybrid Echo Canceller (HEC) 112 is used to reduce the hybrid coupling.

Both the transmit (Tx) and receive (Rx) paths have AGC (Automatic Gain Control) 130, 132 and gain blocks 144, 146 which together perform a signal conditioning function. The AGCs 130, 132 maintain a steady nominal output level with inputs over a much wider dynamic range. The gain blocks 144, 146 apply a fixed amplification or attenuation to the output of the AGCs 130, 132, respectively.

In the receive path the gain block 146 is used to implement digital volume control. In the transmit path, the gain block 144 is used to maintain the required transmit level to the telephone line 122.

Both the transmit Tx and receive Rx paths have a switched loss block 174, 172, respectively, to maintain loop stability. In the transmit Tx path, the switched loss module 174 also includes echo suppression to provide residual echo control.

To overcome the switched loss in the receive path, the speakerphone 10 is preferably artificially forced to a receive state. For instance, this may be handled by forcing the line-ratio comparator 162 to indicate a receive condition during message playback. To those skilled in the art, the term "line-ratio" is also known as "receive switch guard".

With the telephone answering system shown in FIG. 1, the far-end signal can be heard over the local speaker 152 mixed in with the playback of a voice message, all at a level adjusted by the digital volume control 146.

A simultaneous presence of the played back message together with a far-end signal (determined by the receive voice activity detector 166) maintains the speakerphone 10 in a receive state. A sufficiently loud near end signal would cause the speakerphone 10 to break-in from a receive state to a transmit state. In the transmit state, the transmitted microphone signal is mixed with the signal from the message playback module 140 and heard at the far-end.

Accordingly, in order to transmit the message to the far-end, the voice message is combined at some point in the transmit Tx path. If the played back voice message signal is combined before the switched loss echo suppression module 174, then the transmit Tx path should be kept active during the playback of the voice message. Otherwise, the voice message will not be heard at the far-end. However, because it is preferred to keep the transmit Tx path inactive and the receive Rx path active during playback of the voice message to allow the far end to hear the message playback, the voice message signal is preferably added in after the switched loss echo suppression module 174 as shown in FIG. 1.

The message playback will affect only the line-out input to the line-ratio (LR) comparator 162.

It is also preferred that the voice message being played back be heard over the local speaker 152 by the near-end party, at the same level as the far-end conversation. In accordance with the principles of the present invention, this can be handled by combining the voice message signal in the transmit Tx path before the AGC 132 and gain block 146 in the receive Rx path, but after the output of the HEC 112, as shown in FIG. 1. The AGC 132 maintains both the far-end conversation and the played back voice message at the same level.

The receive Rx digital volume control 146 preferably applies to both the played back voice message and to the conversation.

In FIG. 1, the message playback signal is presented to a fixed gain module 142. However, this presumes that the recorded message (e.g., a conversational record message or a voice message received from a caller) was processed through an automatic gain control (AGC) module before it was recorded.

Figure 2:
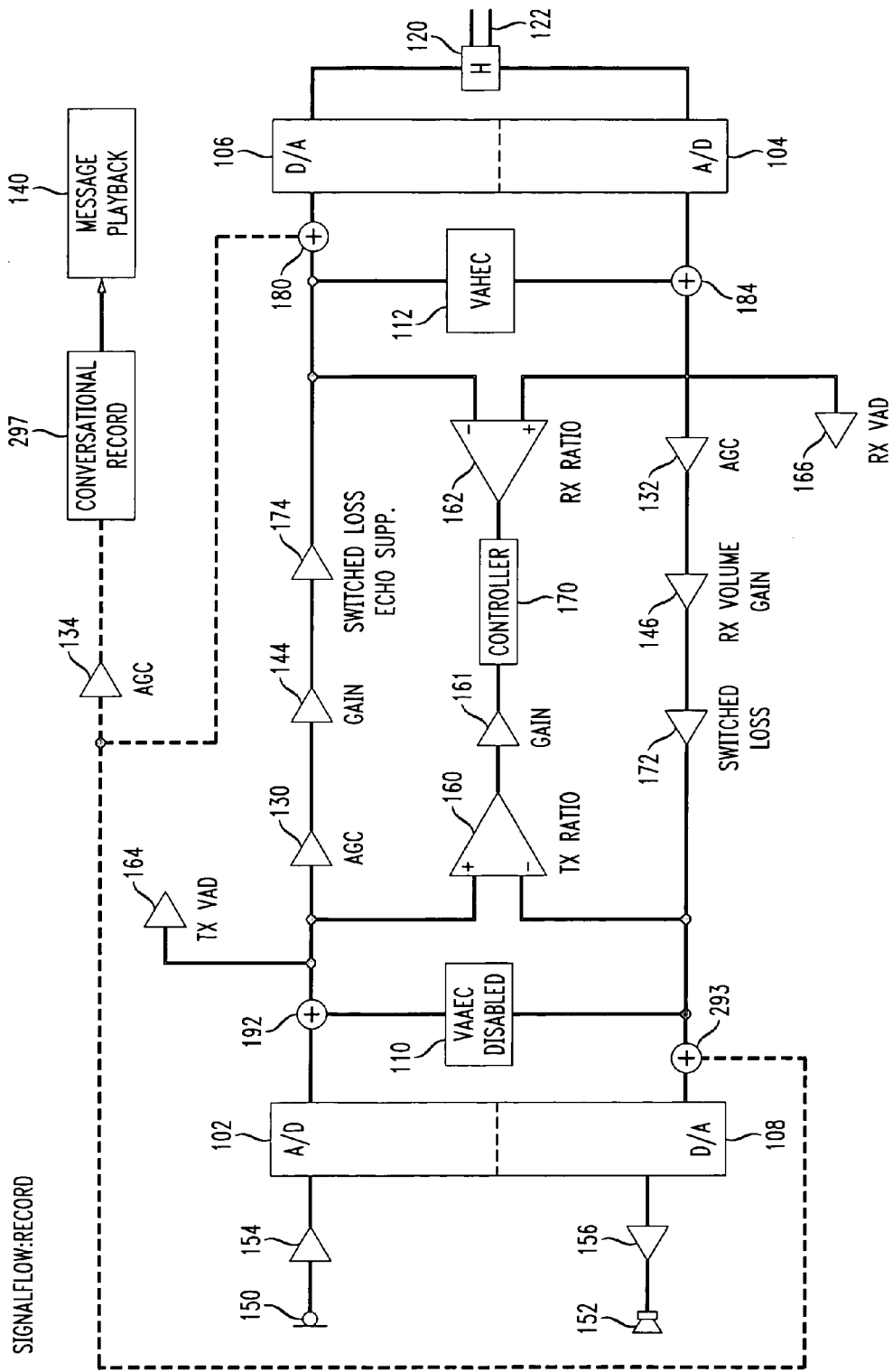
FIG. 2 shows a block diagram of an exemplary full-duplex digital speakerphone allowing conversational record during speakerphone operation, in accordance with the principles of the present invention.

For instance, FIG. 2 shows an exemplary system diagram showing signal flows allowing conversational record during speakerphone operation. In accordance with this aspect, a conversational record feature is used to record a voice message in suitable voice message memory for playback through the message playback module 140. Of course, the principles of the present invention relate equally to an AGC module placed after the voice message is recorded, e.g., between the message playback module 140 and the fixed gain module 142.

Figure 3:
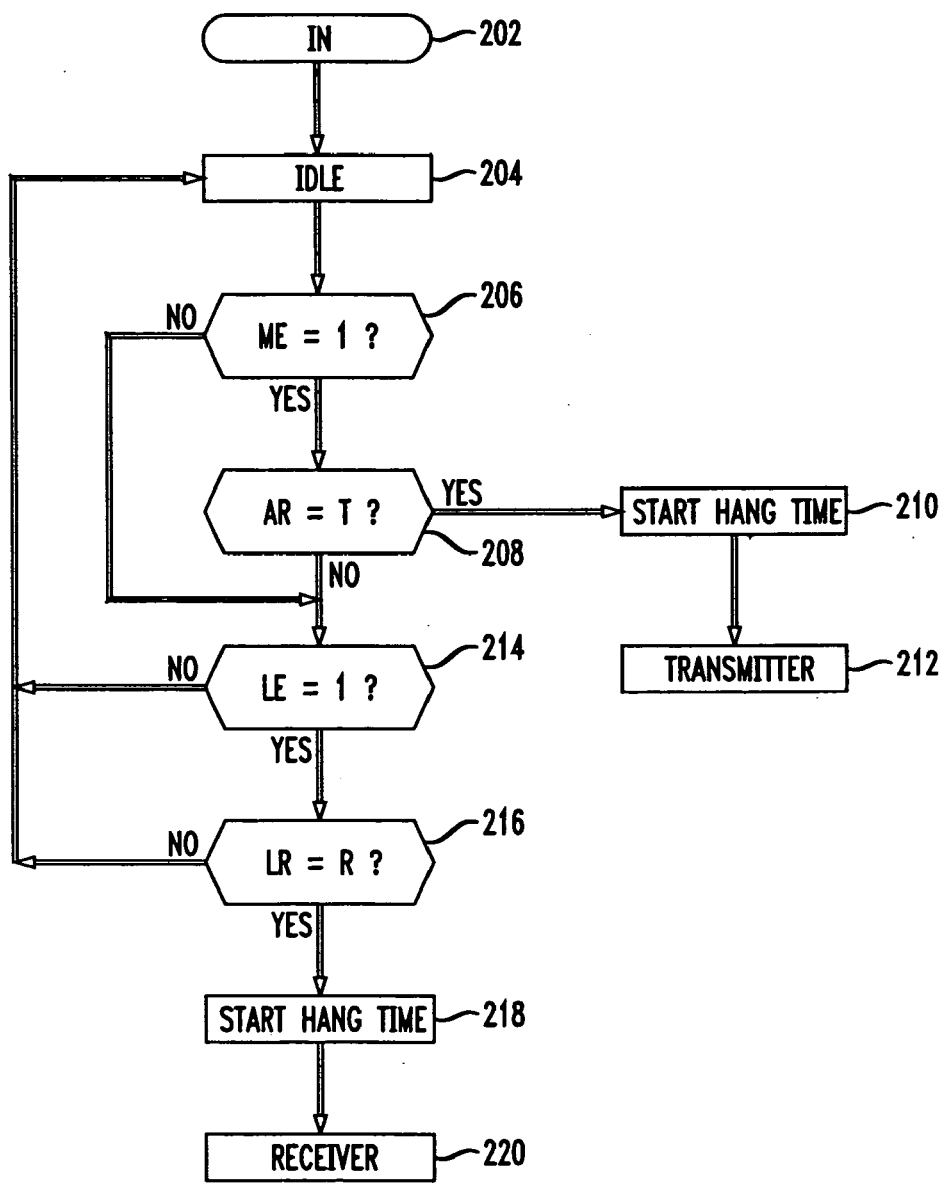
FIG. 3 shows an exemplary process flow of the digital speakerphone/telephone answering device shown in FIG. 1 if no speakerphone conversation is present, the voice message will cause the speakerphone to transition to a receive Rx state, in accordance with the principles of the present invention.
Figure 4:
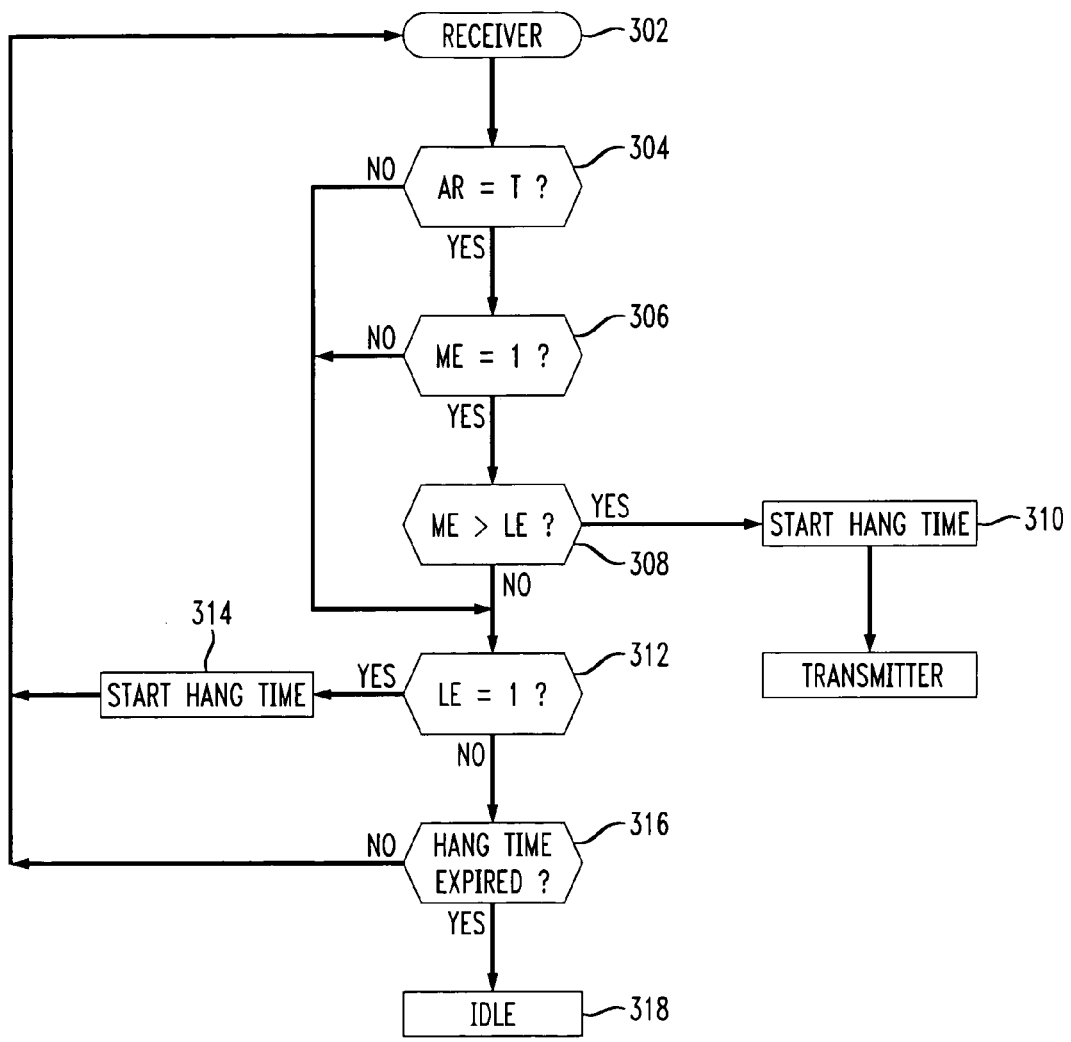
FIG. 4 shows an exemplary process flow of the digital speakerphone/telephone answering device shown in FIG. 1 during a normal receive Rx to transmit Tx break-in condition during normal speakerphone operation, in accordance with the principles of the present invention.
Figure 5:
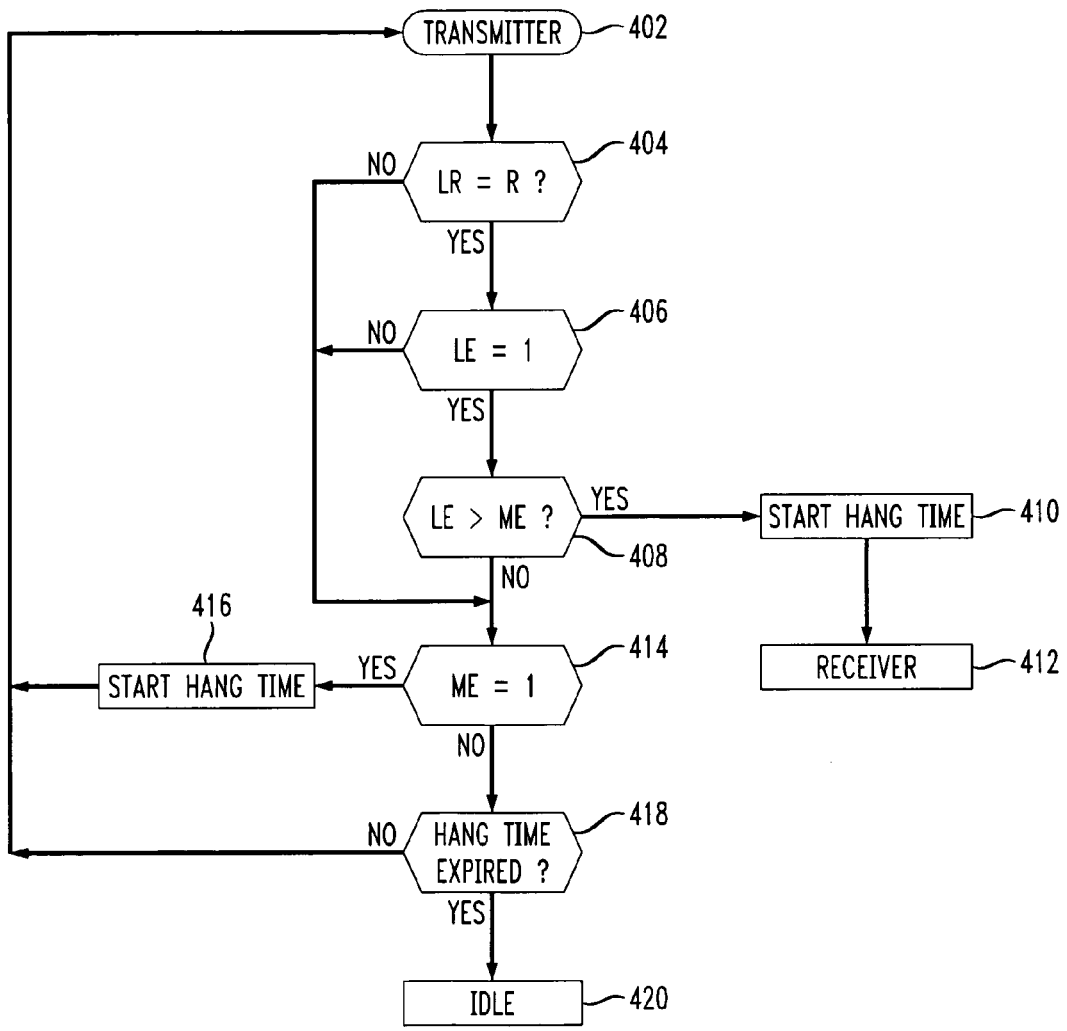
FIG. 5 shows an exemplary process flow of the digital speakerphone/telephone answering device shown in FIG. 1 during a transmit Tx break-in during playback of the voice message, in accordance with the principles of the present invention.

FIGS. 3, 4 and 5 show exemplary switching state diagrams of a digital speakerphone such as the one shown in FIG. 1, in accordance with the principles of the present invention.

In particular, in the state diagrams of FIGS. 3, 4 and 5, ME refers to the output of the Tx VAD (Transmit Voice Activity Detector) 164 shown in FIG. 1, LE to the output of the Rx VAD 166 shown in FIG. 1, LR to the decision of the Line-Ratio comparator test 162, and AR to the decision of the Acoustic-ratio comparator test 160. ME and LE refer to a speech activity decision as well as to an energy level when comparing ME and LE.

Referring back to FIG. 1, the playback of the voice message forces the output of the receive voice activity detector 166 to become active, e.g., LE=1, and forces the output of the line-ratio comparator 162 LR to be equal to R (i.e., in the receive Rx state). Also, the output of the transmit voice activity detector 164 becomes active, e.g., ME=1, and the output of the acoustic ratio comparator 160 becomes AR=R.

FIG. 3 shows that if no speakerphone conversation is present, the voice message will cause the speakerphone 10 to transition to a receive Rx state.

In accordance with the principles of the present invention, the far-end signal can be heard over the local speaker 152 mixed in with the played back voice message. A simultaneous presence of the far-end signal will maintain the receive activity condition active, e.g., LE=1 and LR=R, and will maintain the speakerphone 10 in a receive Rx state.

FIG. 4 shows an exemplary process flow of a normal receive Rx to transmit Tx break-in condition during normal speakerphone operation.

FIG. 5 shows an exemplary process flow of a transmit Tx break-in during playback of a voice message on a speakerphone as shown in FIG. 1.

As shown in FIGS. 4 and 5, a sufficiently loud near-end signal will cause the output of the acoustic ratio comparator 160 to indicate a transmit condition, e.g., AR=T and ME=1. If ME>LE, then the speakerphone 10 switches to a transmit Tx condition. The microphone signal will then be mixed with the played voice message signal and heard at the far-end.

The concurrent capability of voice message playback combined with a conversation signal allows parties involved in a speakerphone conversation to jointly participate in listening to a message recorded on one party's telephone answering device, while at the same time continue their conversation using the speakerphone.

While the invention has been described with reference to the exemplary embodiments thereof, those skilled in the art will be able to make various modifications to the described embodiments of the invention without departing from the true spirit and scope of the invention.

What is claimed is:

1. A voice messaging system with speakerphone capability, comprising:

a microphone signal;

a speakerphone loudspeaker;
a hybrid echo canceller;
an automatic gain control module;
a message playback signal relating to a pre-recorded voice message; and
wherein said message playback signal is combined with said microphone signal before to said hybrid echo canceller and after said automatic gain control module for transmission over a telephone line such that said far end user can hear said microphone signal and said message playback signal, while said far end user can simultaneously speak through said speakerphone loudspeaker.

2. The voice messaging system with speakerphone capability according to claim 1, further comprising:
a fixed message gain module to process said message playback signal.

3. The voice messaging system with speakerphone capability according to claim 2, wherein said message gain module comprises:
an automatic gain control portion; and
a fixed gain portion.

4. The voice messaging system with speakerphone capability according to claim 1, wherein said gain module comprises:
a automatic gain control portion; and
a fixed gain control portion.

5. The voice messaging system with speakerphone capability according to claim 1, further comprising:
a switched loss echo suppression module in said transmit path after said gain module.

6. The voice messaging system with speakerphone capability according to claim 5, wherein:
said message playback signal is combined with said microphone signal at a point in said transmit path after said switched loss echo suppression module.

7. The voice messaging system with speakerphone capability according to claim 6, further comprising:
a digital to analog converter in said transmit path at a point after said switched loss echo suppression module.

8. The voice messaging system with speakerphone capability according to claim 1, further comprising:
a transmit voice activity detector in communication with said transmit path, said transmit voice activity detector indicating a transmit condition of said speakerphone.

9. The voice messaging system with speakerphone capability according to claim 1, wherein:
said voice messaging system is a telephone answering device.

10. A method of transmitting a microphone signal and a played back user pre-recorded voice signal to a far end party over a telephone line using a speakerphone, while simultaneously outputting a voice signal received from said far end user over a loudspeaker of said speakerphone, comprising:
establishing a telephone call;
initiating a transmit function of a speakerphone generating a microphone signal;
playing back a voice message pre-recorded on said speakerphone generating a playback message signal;
combining said microphone signal with said playback message signal before performing hybrid echo cancellation and after performing automatic gain control; and
transmitting said combined microphone signal and playback signal to a far end party over said telephone line while said far end party simultaneously speaks through said loudspeaker of said speakerphone.

11. The method of transmitting a microphone signal and a played back pre-recorded voice signal to a far end party over a telephone line using a speakerphone while simultaneously outputting a voice signal received from said far end user over a loudspeaker of said speakerphone according to claim 10, further comprising:
adjusting a gain of said microphone signal.

12. The method of transmitting a microphone signal and a played back pre-recorded voice signal to a far end party over a telephone line using a speakerphone while simultaneously outputting a voice signal received from said far end user over a loudspeaker of said speakerphone according to claim 11, further comprising:
adjusting a gain of said playback message signal.

13. The method of transmitting a microphone signal and a played back pre-recorded voice signal to a far end party over a telephone line using a speakerphone while simultaneously outputting a voice signal received from said far end user over a loudspeaker of said speakerphone according to claim 11, wherein:
said adjusting similarly adjusts a gain of both said microphone signal and said playback message signal.

14. The method of transmitting a microphone signal and a played back pre-recorded voice signal to a far end party over a telephone line using a speakerphone while simultaneously outputting a voice signal received from said far end user over a loudspeaker of said speakerphone according to claim 11, wherein:
said combining occurs at a point in a transmit path after a gain of said microphone signal is adjusted.

15. Apparatus for transmitting a microphone signal and a played back user pre-recorded voice signal to a far end party over a telephone line using a speakerphone while simultaneously outputting a voice signal received from said far end user over a loudspeaker of said speakerphone, comprising:
means for establishing a telephone call;
means for initiating a transmit function of a speakerphone generating a microphone signal;
means for playing back a voice message pre-recorded on said speakerphone generating a playback message signal;
means for combining said microphone signal with said playback message signal before performing hybrid echo cancellation and after performing automatic gain control; and
means for transmitting said combined microphone signal and playback signal to a far end party over said telephone line while said far end party simultaneously speaks through said loudspeaker of said speakerphone.

16. The apparatus for transmitting a microphone signal and a played back pre-recorded voice signal to a far end party over a telephone line using a speakerphone while simultaneously outputting a voice signal received from said far end user over a loudspeaker of said speakerphone according to claim 15, further comprising:
means for adjusting a gain of said microphone signal.

17. The apparatus for transmitting a microphone signal and a played back pre-recorded voice signal to a far end party over a telephone line using a speakerphone while simultaneously outputting a voice signal received from said far end user over a loudspeaker of said speakerphone according to claim 15, further comprising:
means for adjusting a gain of said playback message signal.

18. The apparatus for transmitting a microphone signal and a played back pre-recorded voice signal to a far end party over a telephone line using a speakerphone while simultaneously outputting a voice signal received from said far end user over a loudspeaker of said speakerphone according to claim 15, wherein:

said means for adjusting similarly adjusts a gain of both said microphone signal and said playback message signal.

19. The apparatus for transmitting a microphone signal and a played back pre-recorded voice signal to a far end party over a telephone line using a speakerphone while simultaneously outputting a voice signal received from said far end user over a loudspeaker of said speakerphone according to claim 16, wherein:

said means for combining combines said microphone signal with said playback message signal at a point in a transmit path after said means for adjusting said microphone signal.

* * * * *